GEORGE W. SCHNEIDER, JR.
INVENTOR.

BY Lyon & Lyon
ATTORNEYS

GEORGE W. SCHNEIDER, JR.
INVENTOR.

BY Lyon&Lyon
ATTORNEYS

GEORGE W. SCHNEIDER, JR.
INVENTOR.

BY Lyon & Lyon
ATTORNEYS

United States Patent Office 3,554,032
Patented Jan. 12, 1971

3,554,032
ROTARY FLUID METER
George W. Schneider, Jr., Huntingdon Valley, Pa., assignor, by mesne assignments, to The Singer Company, a corporation of New Jersey
Filed Jan. 3, 1967, Ser. No. 606,821
Int. Cl. G01f 3/08
U.S. Cl. 73—257
4 Claims

ABSTRACT OF THE DISCLOSURE

A bladed rotor support at both ends within a housing turns in timed relation with a pocketed rotary gate mounted substantially within the rotor and turning in the same direction. The rotor blades pass through an arcuate channel and the gate pockets receive them as they pass between the channel ends. One end of the rotor is supported by rollers engaging a trackway, and an internal gear drive near the trackway connects the rotor to the pocketed gate.

BACKGROUND OF THE INVENTION

This invention relates to rotary meters for measuring the flow rate of fluids. A device of this type may be classified as a rate of flow meter, vane type. Devices of this general type are shown in United States patents Vom Hofe No. 805,552, Loveridge et al. No. 1,994,397, Booth No. 2,258,504, and in French patent to Myard No. 977,510. While these prior art patents disclose the idea of mounting the rotary pocketed gate substantially within the bladed rotor, thereby achieving minimum lateral overall dimensions, they do not teach how this may be accomplished when both ends of the rotor and both ends of the gate are to be supported in bearings, together with gearing inside the housing for turning the pocketed gate in timed relation with the rotor blades.

SUMMARY

Briefly stated, this invention concerns a fluid meter having a stationary body provided with an arcuate channel through which rotor blades pass from the inlet to the outlet. These blades are received in pockets in a rotary gate positioned substantially within the rotor and turning in the same direction. Both ends of the rotor and both ends of the pocketed gate are mounted in bearings carried on the body. One of the rotor bearings takes the form of a trackway engaged by a plurality of individual rollers. An internal gear on the rotor mounted near the trackway meshes with a gear within the rotor and fixed to the pocketed gate.

DESCRIPTION OF THE PREFERRED EMBODIMENT

Figure 1:
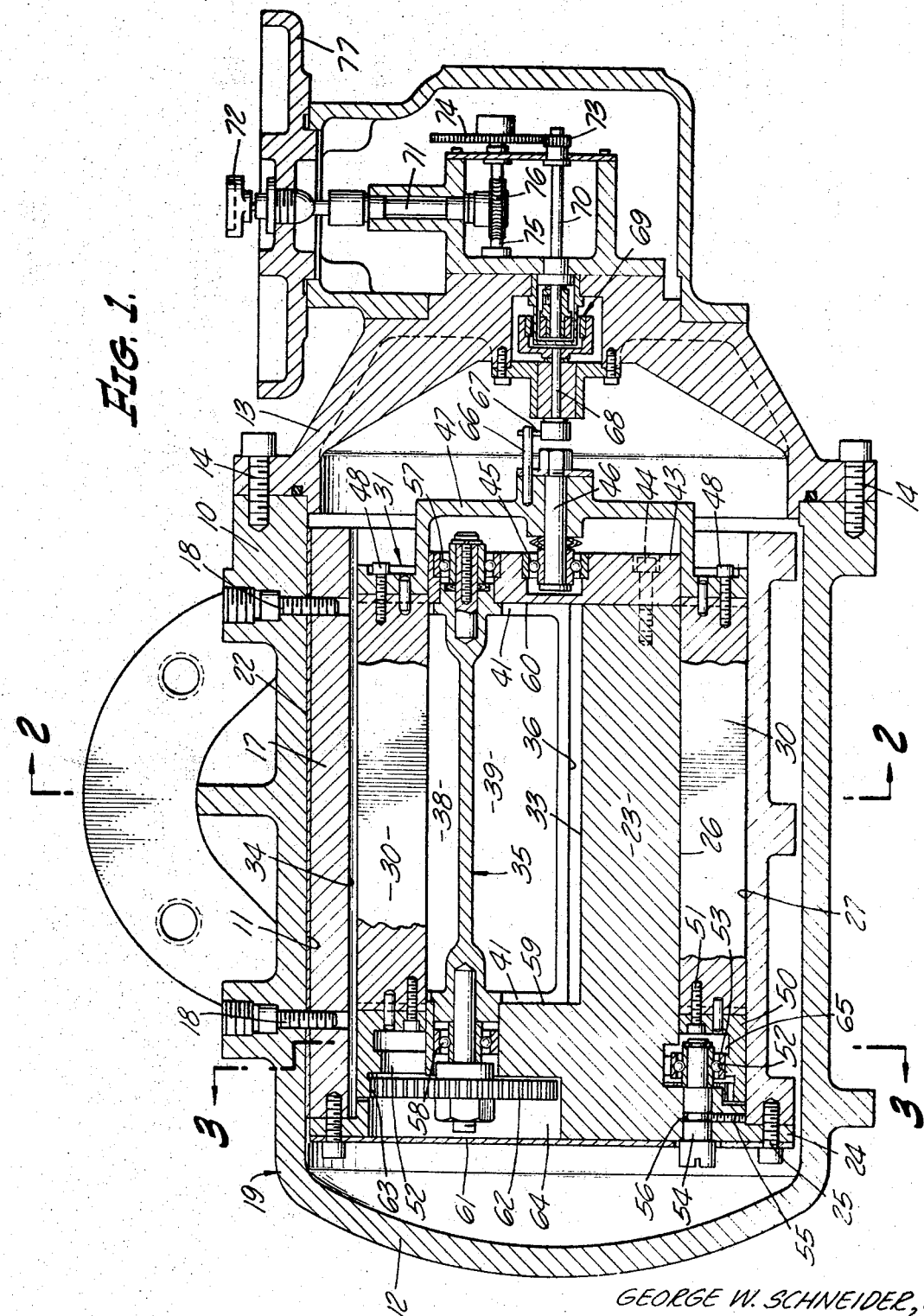
FIG. 1 is a sectional side elevation showing a preferred embodiment of the invention.

Referring to the drawings, the stationary housing generally designated 10 has a central opening 11. This opening 11 is closed at one end by the integral end member 12, and is closed at the other end by the bonnet 13 attached to the housing 10 by fastenings 14. The housing has an inlet passage 15 and an outlet passage 16. A stationary liner 17 is positioned within the bore 11 and is fixed to the housing 10 by means of the fasteners 18. The housing 10 and liner 17 are part of the stationary body 19. The liner 17 has a port 20 aligned with the inlet passage 15 and a port 21 aligned with the outlet passage 16. A gasket 22 is clamped between the housing 11 and the liner 17, in the region of the openings 20 and 21.

A stationary crescent-shaped member 23 is provided with an end flange 24 fixed to the liner 17 by fastenings 25. This member 23 has an outer wall surface 26 which is concentric with the inner wall surface 27 in the liner 17, and these walls define an arcuate channel 28 between them. This arcuate channel 28 receives the blades 30 of a rotor generally designated 31, and mounted to rotate within the liner 17. An offset cavity 32 within the liner 17 is defined by the concave cylindrical surfaces 33 and 34, and this cavity 32 intersects the arcuate channel 28. A rotary gate 35 is mounted to turn in the offset cavity 32 and its outer cylindrical surface 36 fits closely within the surfaces 33 and 34. This surface 36 is interrupted to provide entrance openings 37 into separate pockets 38 and 39 formed within the rotary gate 35. The end walls 41 of the rotary gate 35 are cut away, as shown at 42, to provide clearance for the rotor blades 30. The axis of the rotor 31 intersects the offset cavity 32 and the path of movement of the rotary gate 35 because the diameter of the rotary gate is greater than one-half the diameter of the rotor 31.

For reasons of manufacture and assembly, the members 23 includes a stationary plate 43 fixed thereto by fastenings 44. A front bearing assembly 45 is mounted in this plate 43 and supports the trunnion 46 fixed on the end flange 47 of the rotor 31. The rotor blades 30 are secured to this end flange 47 by means of threaded fastenings 48.

An end ring 50 is secured to the other ends of the blades 30 by means of fastenings 51, and this end ring 50 is provided with a circular trackway 52. This trackway 52 is contacted by a plurality of circumferentially spaced rollers 53 each mounted on a support or trunnion 54 carried on the member 23. A set screw 55 engages a groove 56 in each support pin 54 to prevent axial movement of the support pin. From this description it will be understood that one end of the rotor 31 is supported by means of the trunnion 46 and bearing 4, and the other end is supported by means of the rollers 53 and trackway 52.

The rotary gate 35 is supported on axially spaced bearings 57 and 58. The bearing 57 is carried on the plate 43 and the bearing 58 is carried on the crescent-shaped member 23. The parallel end walls 41 on the rotary gate have running clearance with the stationary wall 59 and surface 60 of the plate 43, respectively. An external spur gear 62 is fixed to the rotary gate 35 and meshes with the internal spur gear 63 provided on the ring 50 of the rotor 31. The gear 63 is mounted within a clearance pocket 64 provided on the member 23. The pitch diameter of the gear 62 is one-half that of the internal gear 63, so that the rotary gate 35 turns at twice the speed of the rotor 31. Thus, only two pockets 38, 39 in the rotary gate 35 are adequate for successive reception of the four rotor blades 30.

Mechanism for driving a counter or other readout device is conveniently mounted in the bonnet 13. Thus, an axially projecting offset pin 66 on the rotor flange 47 engages a radially projecting arm 67 fixed to the shaft 68. A magnetic coupling device 69 connects the shaft 68 to the shaft 70. The shaft 70 drives the shaft 71 and coupling 72 through speed-reducing gearing 73, 74 and 75, 76. A suitable counter (not shown) may be driven by the coupling 72.

The bearing assemblies 45, 57 and 58, as well as the bearing assemblies within the rollers 53, are self-contained and are prepacked with lubricant. The same is true of the gears 62 and 63, and of the trackway 52 and its supporting rollers 53. The trackway 52 and internal gear 63 form a portion of the outer boundary of an annular space 65 into which the trunnions 54 and gear 62 project. The only openings through which fluid can flow into these latter areas are the long labyrinth seals formed by the running clearances between the rotating and stationary parts, since the back opening is closed by means of the cover plate 61. Dirt particles in the fluid stream are thus excluded from the bearings, gears and trackway.

Upon removal of the bonnet 13, after disassembly of the fastenings 14, the internal parts of the meter including the liner 17, rotor 31 and pocketed gate 35, may be removed from the housing 10. The fastenings 18 are first removed and this permits the liner 17 with all of its internal parts to be withdrawn axially from the bore 11 in the housing 10. The piping connections to the inlet 15 and outlet 16 need not be disturbed. A new subassembly of liner 17, rotor 31, pocketed gate 35, etc. may be placed in position and the line returned to service, with a minimum of "down" time. Furthermore, the housing 10 is constructed to carry loads due to piping and thermal expansion stresses, and therefore the liner 17 and internal parts are free of stresses which could cause distortion and possible binding of rotating elements.

Figures 2, 3:
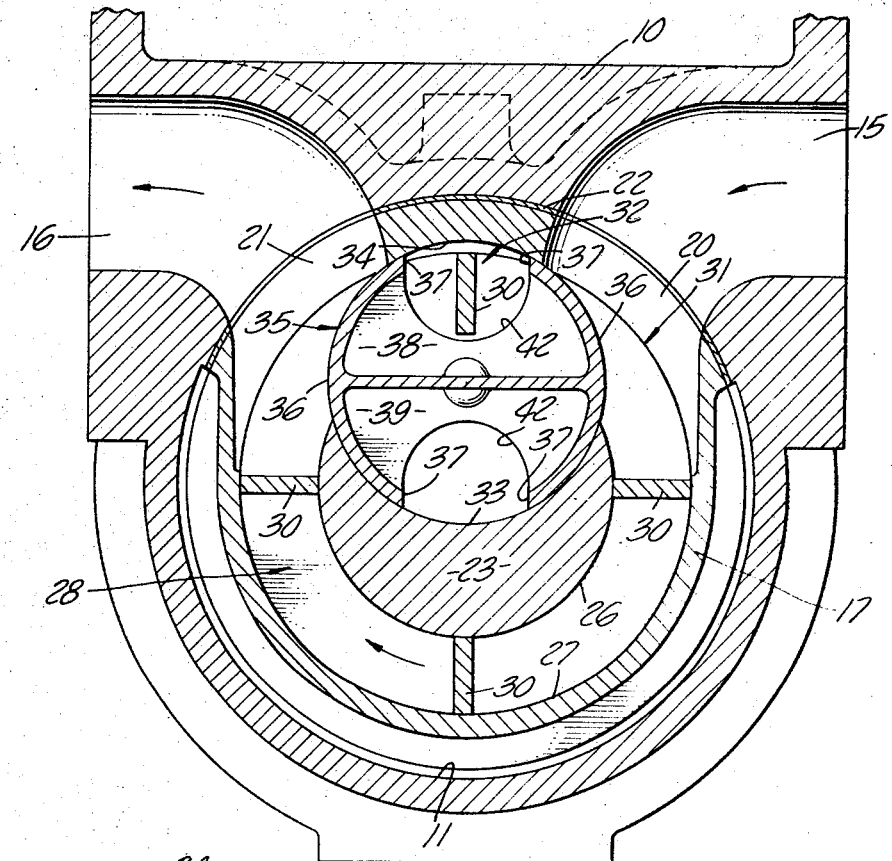
FIG. 2 is a transverse sectional view taken substantially on the lines 2—2 as shown in FIG. 1.
FIG. 3 is a transverse sectional elevation taken substantially on the lines 3—3 as shown in FIG. 1.
Figure 4:
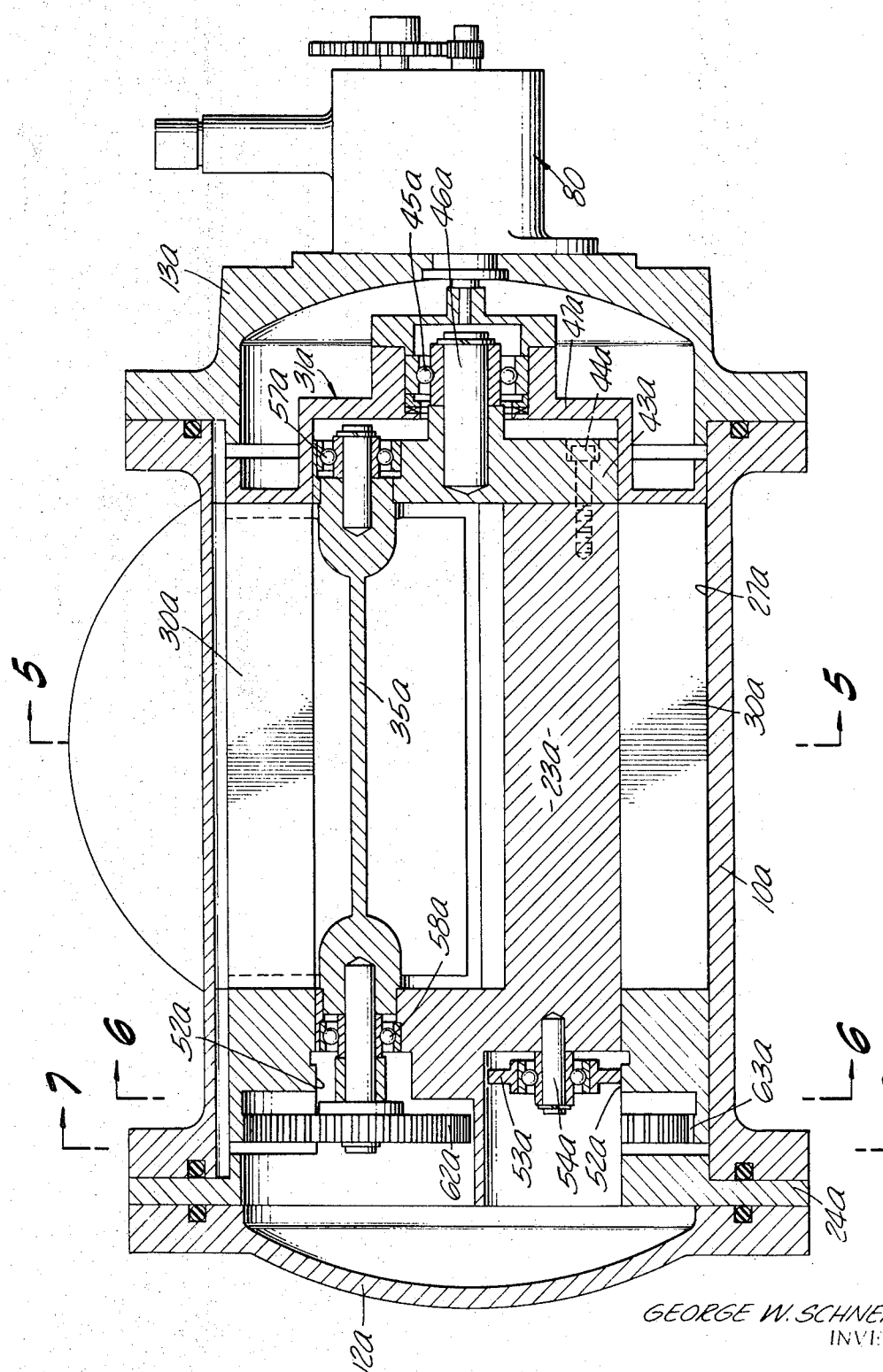
FIG. 4 is a sectional elevation showing a modified form of the invention.
Figure 5:
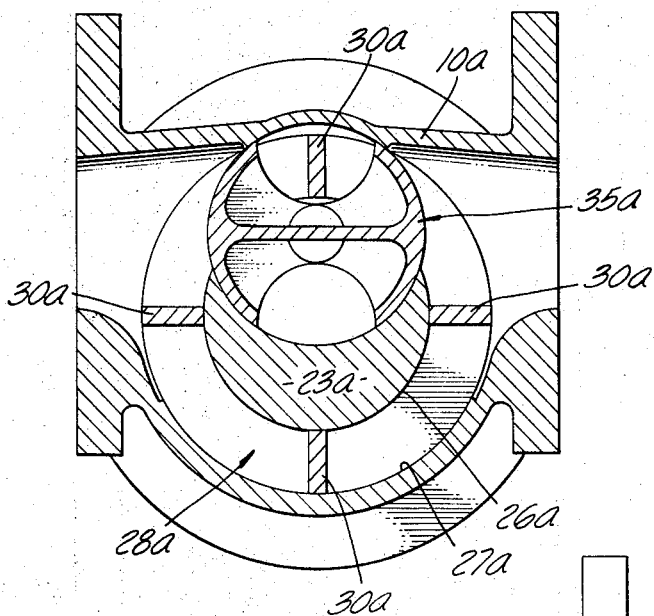
FIGS. 5, 6 and 7 are transverse sectional elevations taken substantially on the lines 5—5, 6—6 and 7—7 of FIG. 4, respectively.
Figure 6:
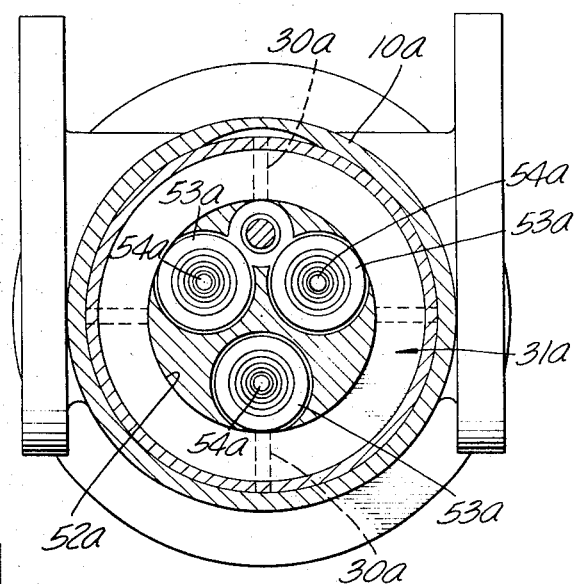
Figure 7:
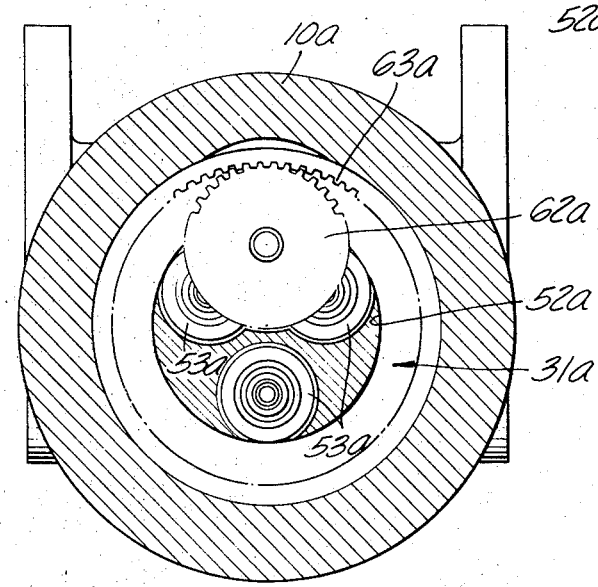

In operation, the housing flanges at the inlet 15 and outlet 16 are connected to suitable piping, not shown. The central opening 11 preferably extends in a horizontal direction, although this is not essential. The assembly of the liner 17, rotor 31, pocketed gate 35 and associated parts is then installed axially into the central opening 11, in the absence of the bonnet 13. The liner 17 is then clamped in position within the housing 10 by means of the fastenings 18. The bonnet 13 is then placed in position and secured by means of the fastenings 14. The parts are then in the position shown in FIGS. 1–3 of the drawings. A suitable counter mechanism, not shown, is mounted on the bonnet flange 77 and arranged to be driven by the coupling 72.

Fluid under pressure is then admitted through the inlet passage 15 and opening 20 and into the annular channel 28. Fluid pressure acting on the upstream side of one of the rotor vanes 30 (shown at the 3:00 o'clock position in FIG. 2) causes the rotor 31 to turn within the liner 17 in a clockwise direction. The gearing 63, 62 turns the pocketed gate 35 in a clockwise direction at twice the speed. The pocketed gate 35 prevents direct flow from the inlet 15 to the outlet 16 and requires the fluid to flow through the annular channel 28. Each of the rotor blades 30 is received in one of the gate pockets 38 or 39 as it passes from a position near the outlet 16 to a position near the inlet 15. Rotation of the rotor 31 is transmitted through the pin 66 and shaft 68, magnetic coupling 69, and through the speed-reduction gearing to the drive coupling 72.

In the modified form of the invention shown in FIGS. 4–7, the liner is omitted and the rotor 31a is mounted to turn within the cylindrical bore 27a of the stationary housing 10a. A bearing assembly 45a is carried by the rotor flange 47a and is mounted on the stationary trunnion 46a fixed to the plate 43a. The other end of the rotor 31a is provided with a trackway 52a supported on rollers 53a carried on trunnions 54a fixed to the crescent-shaped member 23a. The rotary gate 35a is mounted on axially spaced bearings 57a and 58a and is driven by the external gear 62a meshing with the internal gear 63a. The rotor blades 30a pass through the arcuate channel 28a defined between the concentric surfaces 26a and 27a. The bonnet 13a closes one end of the housing 10a and the removable cover plate 12a closes the other end. Fastenings for connecting the bonnet 13a to the housing 10a and for clamping the flange 24a of the member 23a and between the housing 10a and the cover plate 12a are provided, but are not shown in the drawings. Also, details of the speed reducer 80 on the bonnet 13a are omitted from the drawings. In other respects, the modified device as shown in FIGS. 4, 5, 6 and 7 is similar in construction and operation to the device previously described.

Having fully described my invention, it is to be understood that I am not to be limited to the details herein set forth but that my invention is of the full scope of the appended claims.

I claim:

1. In a fluid meter, the combination of: a stationary body, a rotor mounted to turn about an axis within the body, the rotor having an end flange and an axially spaced end ring and a plurality of blades extending axially from the end flange to the end ring, a stationary member projecting axially into the interior of the rotor through said end ring and having an end flange secured to the body at one end, front bearing means supporting the rotor end flange on the stationary member, the rotor end ring having a trackway and having an internal gear thereon, a plurality of circumferentially spaced rollers engaging said trackway, a plurality of trunnions mounted on said stationary member adjacent its end flange, each of said trunnions rotatably supporting one of said rollers, respectively, a pocketed gate mounted substantially within the rotor and having a path of movement intersected by the rotor axis, axially spaced bearings on said stationary member rotatably supporting said gate, the gate having at least one pocket therein, and a gear fixed to the gate meshing with said internal gear for turning the gate in timed relation with the rotor and in the same direction, whereby each rotor blade is received in a gate pocket while moving though a path of travel.

2. The combination set forth in claim 1 wherein the trackway and internal gear form a portion of the outer boundary of an annular space into which said trunnions and said gear project, the running clearance between said end ring and said body and said end flange on said stationary member serving to exclude foreign matter in the fluid from reaching said gears, rollers and trackway.

3. In a fluid meter, the combination of: a stationary housing having an inlet and an outlet each communicating with a central opening in the housing, a stationary liner axially insertable into said central opening, and having ports aligned with said inlet and outlet, respectively, a rotor mounted to turn about an axis within the liner, the rotor having a plurality of axially extending blades, a stationary member projecting axially into the interior of the rotor and having an end flange secured to the liner at one end, front bearing means supporting the rotor on the stationary member, an end ring on the rotor having a trackway and having an internal gear thereon, a plurality of circumferentially spaced rollers engaging said trackway, a plurality of trunnions mounted on said stationary member adjacent its end flange, each of said trunnions rotatably supporting one of said rollers, respectively, a pocketed gate mounted substantially within the rotor and having a path of movement intersected by the rotor axis, axially spaced bearings on said stationary member rotatably supporting said gate, the gate having at least one pocket therein, a gear fixed to the gate meshing with said internal gear for turning the gate in timed relation with the rotor and in the same direction, whereby each rotor blade is received in a gate pocket while moving through a path of travel, and releasable means securing the liner within the body whereby the liner, stationary member, rotor and gate may be removed axially as a unit from said central opening in the body.

4. In a fluid meter, the combination of: a stationary housing having an inlet and an outlet each communicating with a central opening in the housing, a stationary liner axially insertable into said central opening, and having ports aligned with said inlet and outlet, respectively, a rotor mounted to turn about an axis within the liner, the rotor having an end flange and an axially spaced end ring and a plurality of blades axially from the end flange to the end ring, a stationary member projecting axially into the interior of the rotor through said end ring and having an end flange secured to the liner at one end, front bearing means supporting the rotor end flange on the stationary member, the rotor end ring having a trackway and having an internal gear thereon, a plurality of circumferentially spaced rollers engaging said trackway, a plurality of trunnions mounted on said stationary member adjacent its end flange, each of said trunnions rotatably supporting one of said rollers, respectively, a pocketed gate mounted substantially within the rotor and having a path of movement intersected by the rotor axis, axially spaced bearings on said stationary member rotatably supporting said gate, the gate having at least one pocket therein, a gear fixed to the gate meshing with said internal gear for turning the gate in timed relation with the rotor and in the same direction, whereby each rotor blade is received in a gate pocket while moving through a path of travel, and releasable means securing the liner within the body whereby the liner, stationary member, rotor and gate may be removed axially as a unit from said central opening in the body.

References Cited

UNITED STATES PATENTS

| | | | |
|---|---|---|---|
| 78,795 | 6/1868 | Flad | 73—253 |
| 1,234,262 | 7/1917 | Bateman | 91—95 |
| 3,304,781 | 2/1967 | Stevenson | 73—253 |
| 3,482,446 | 12/1969 | Wrinkle et al. | 73—257 |

FOREIGN PATENTS

| | | | |
|---|---|---|---|
| 2,331 | 9/1864 | Great Britain | 91—133 |

JAMES J. GILL, Primary Examiner

U.S. Cl. X.R.

91—95